United States Patent [19]

Dickerson

[11] 4,091,552
[45] May 30, 1978

[54] DIABETIC DIARY

[76] Inventor: Samuel C. Dickerson, 316 Gary St., Henderson, N.C. 27536

[21] Appl. No.: 677,961

[22] Filed: Apr. 19, 1976

[51] Int. Cl.² ............................................. G09F 11/24
[52] U.S. Cl. .......................................... 40/518; 281/7
[58] Field of Search ....................... 40/86; 281/6, 7, 8, 281/9; 282/4

[56] References Cited

U.S. PATENT DOCUMENTS

| | | | |
|---|---|---|---|
| 879,082 | 2/1908 | Cave | 282/4 |
| 1,529,422 | 3/1925 | Dravo | 281/11 |
| 1,582,301 | 4/1926 | Pankau | 281/6 |
| 1,801,384 | 4/1931 | Youkers | 40/86 R |
| 3,433,406 | 3/1969 | Carter | 40/86 R |

FOREIGN PATENT DOCUMENTS

| | | | |
|---|---|---|---|
| 174,366 | 3/1935 | Switzerland | 281/7 |

*Primary Examiner*—Louis G. Mancene
*Assistant Examiner*—Wenceslao J. Contreras
*Attorney, Agent, or Firm*—William J. Daniel

[57] ABSTRACT

A record keeping device for diabetics having a generally flat rectangular housing containing rotatable supply and take-up rollers for an elongated record strip which is progressively fed across the exterior surface of a median platform portion of the housing top wall through egress and ingress slots therein by manually operable exterior knobs. The record strip is divided cross-wise into daily rows and lengthwise into a number of columns for recording the results and times of the usual diabetic diagnostic tests, the quantity of insulin injected, the selected injection site on the body, plus miscellaneous comments, and the housing face carries appropriate identifying indicia for each such column.

3 Claims, 3 Drawing Figures

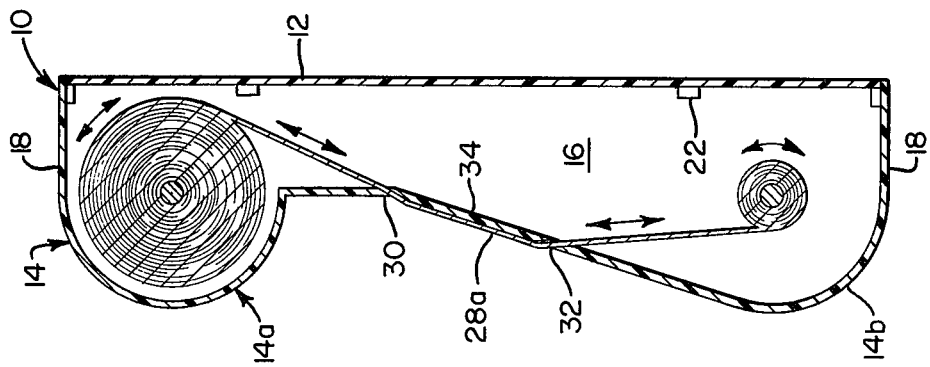
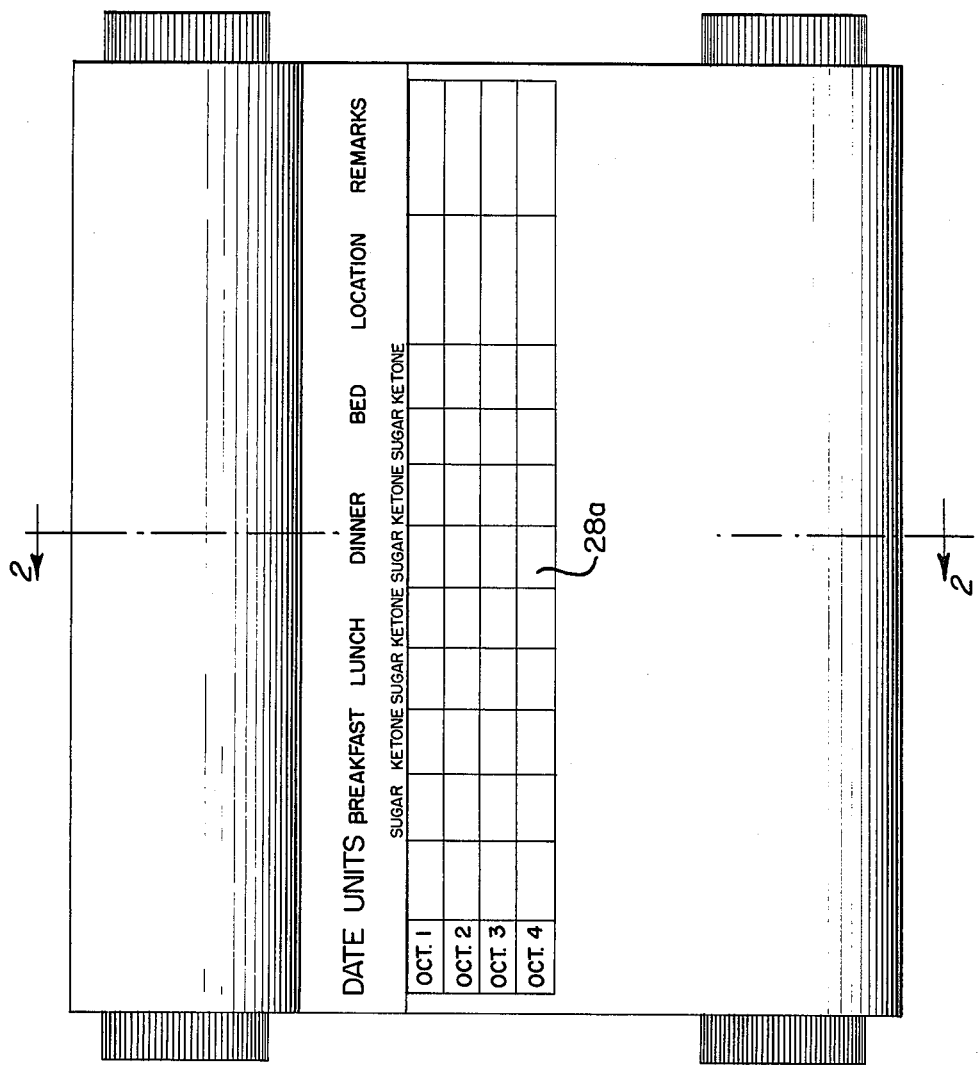

DIABETIC DIARY

FIELD OF INVENTION

This invention relates to a record keeping device for persons suffering from diabetes and is concerned, more particularly, with a "diary" for recording daily the results of diagnostic tests and medicinal administration by such patients.

BACKGROUND OF THE INVENTION

Diabetes mellitus is a disease resulting from an insufficiency of insulin usually due to an insufficient output from the pancreas. When the level of insulin is inadequate, the body cells are unable to utilize the sugar which is produced as glucose by the digestive process and supplied via the bloodstream. Consequently, the level of sugar increases in the bloodstream and is excreted into the urine for discharge from the body. In an attempt to compensate for this abnormal sugar level in the blood and urine, the body extracts water from its tissues which eventually results in increased excretion of fluid in the urine, and as this fluid must be replaced, the patient experiences an excessive thirst along with other symptoms, such as weakness and lassitude, of varying degree dependent upon the severity of the disease at the time.

Absent effective control of the disease, the body due to its inability to supply sufficient usable "energy" to the cells begins, in effect, to consume itself, breaking down fat and protein from the body tissues and in the process, producing acetone and diacetic acid, the so-called "ketone bodies," as by-products. When allowed to accumulate to excess levels, the ketone bodies exert a poisonous action on the human system which leads to dehydration and eventual coma unless the condition is checked.

In the maintenance or control of severe cases of diabetes mellitus, such as juvenile onset and so-called "brittle" diabetes, the patient is required to perform daily tests to ascertain the levels of sugar and ketone bodies excreted in the urine and to record these results for evaluation by the attending physician to determine whether the prescribed regime of insulin administration is maintaining the disease under effective control. The making of these tests is especially important in the case of juveniles not only because of the normal severity of juvenile onset cases but the tendency for the blood sugar levels in juveniles to range widely making it difficult for the disease to be maintained on an otherwise apparently proper dosage of insulin. For the same reason, the juvenile is especially subject to over-reaction to insulin administration, leading to an excessively low blood sugar level, i.e. hypoglycemia, which can have as serious consequences as the diabetes itself.

OBJECTS OF THE INVENTION

The principal object of this invention is, therefore, a record keeping device or "diary" which is designed to enable diabetic patients to easily record on a daily basis the results of diagnostic tests that they are required to perform along with other pertinent medical information to furnish to their attending physician the evidence required for an evaluation of the current state of the disease.

Another object is a simple and conveniently arranged "diary" for diabetic patients which is of a small compact portable design and can be located in a conspicuous position to serve as a reminder for the diagnostic tests needed to be performed.

DESCRIPTION OF THE DRAWINGS

These and other objects and advantages will be revealed by the following detailed description when read in conjunction with the accompanying drawings, in which:

FIG. 1 is a top plan view of the record keeping device of the invention;

FIG. 2 is a vertical cross-sectional view taken along line 2—2 of FIG. 1; while

SUMMARY OF THE INVENTION

Figure 3:
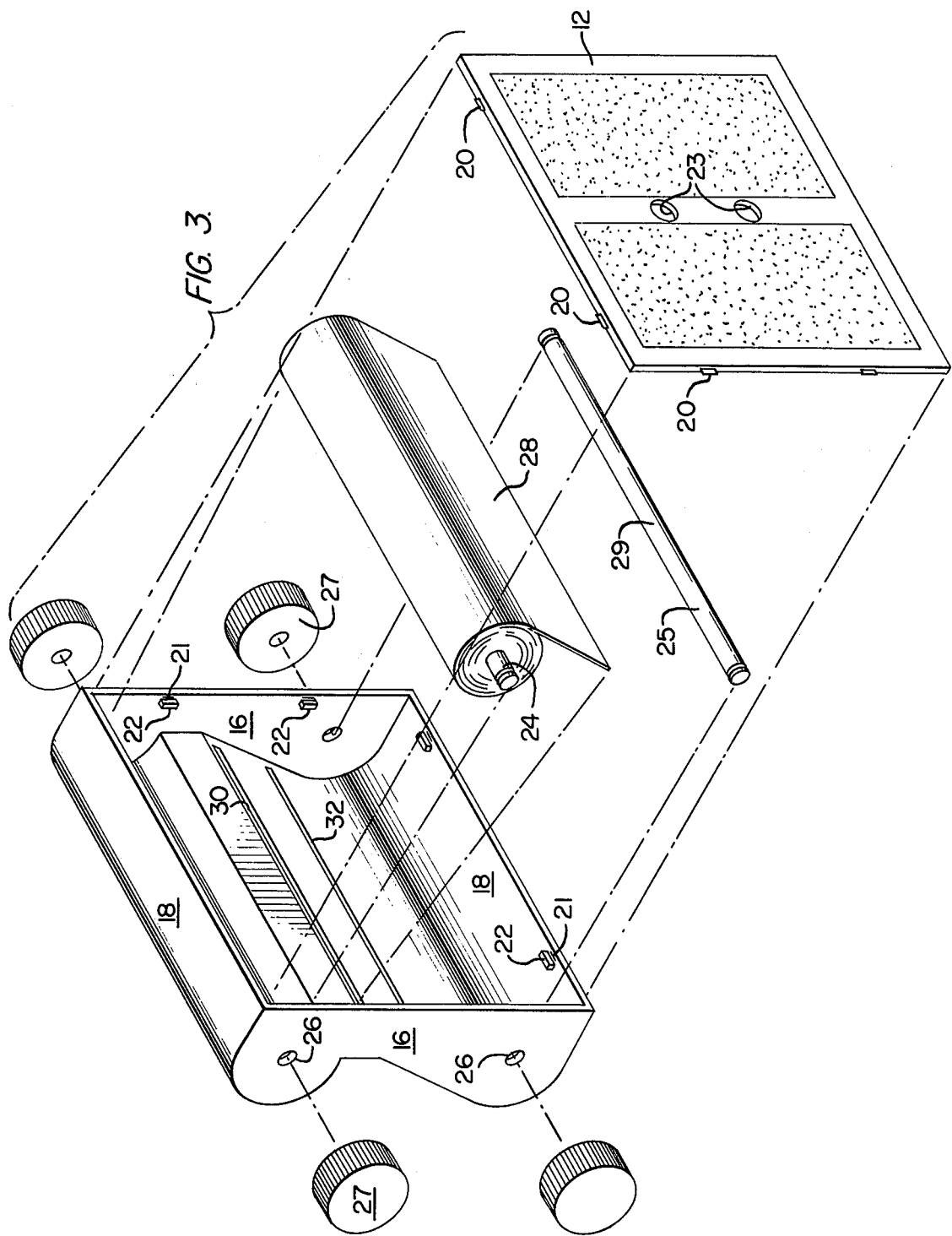
FIG. 3 is an exploded perspective view taken from the rear and showing the component parts.

The record keeping device of the invention includes a relatively flat, generally rectangular housing, in which are situated two parallel spaced apart rollers, one having a length of a record strip wound thereon and serving as a supply roller for the strip and the other as a take-up roller upon which the paper strip can be gradually wound by rotating exterior knobs connected to the rollers. The front wall of the housing has two parallel spaced apart slots which extend transversely of the lengthwise direction of the record strip and define between them a narrow supporting panel. The record strip emerges from the housing through one slot, passes over the exterior face of the supporting panel to provide an exposed region accessible for inscription thereon and re-enters the housing through the opposite slot for winding onto the take-up roller. The paper strip is divided cross-wise into daily rows and lengthwise into plural sections or columns for receiving record entries thereon and the exterior surface of the front housing wall carries in alignment with the respective columns indicia identifying particular information to be recorded therein including the diagnostic tests to be performed, the times they were performed, the amount of insulin administered and other pertinent medical information. Preferably, the front housing wall is inclined at a small angle relative to the plane of the back wall, except for an enlargement at one end to enclose one of the interior rollers.

DETAILED DESCRIPTION OF THE DRAWINGS

In the drawings, the numeral 10 generally designates a relatively flat, generally rectangular housing for the record keeping device of the invention which includes a front wall 14 and spaced apart pairs of side walls and end walls 16 and 18, respectively, formed as an integral unit. Opposite front wall 14, the opening defined by walls 16, 18 is closed by a flat removable rear cover 12 having keys 20 projecting at spaced points around its periphery for engagement in corresponding slits 21 formed for that purpose in the margins of the side and end walls. Lugs 22 are arranged at spaced points just within the interior of the side and end walls as bearing surfaces to hold the rear cover against intrusion into the housing interior. Rear cover 12 is sufficiently flexible as to bend to permit keys 20 to be disengaged from slits 21 along one end for releasing the same.

The rear cover may include apertures, as at 23, which can be used to detachably mount the housing on a vertical surface, such as the wall of a room, by engagement with the heads of screws or the like threaded into the surface.

Within the housing adjacent each of the upper and lower end walls 18 is mounted a roller 24, 25 having its ends thereof rotatably projecting through apertures 26 (see FIG. 3) in the housing side walls 16 and carrying at at least one exteriorly projecting end a knob 27. One roller 24 carries a considerable length of record web or strip 28 of a material suitable for inscription by writing or printing which is wound thereon to serve as a supply roller, while the other roller 25 has the free end of strip 28 attached thereto to act as a take-up roller for the record strip as it is unwound from the supply. Take-up roller 25 may be slotted as at 29 to facilitate threading of the free end of the paper strip thereon or the strip 28 may be equipped with an adhesive leader or the like for engagement on the take-up roller.

At an intermediate position between end walls 16, the front housing wall 14 is penetrated by two spaced apart narrow slots 30, 32 extending transversely of the lengthwise direction of movement of the record strip to define a supporting panel 34 for an exposed, exteriorly accessible, section 28a of record strip seen in FIGS. 1 and 2. That is to say, the record strip emerges from the housing interior through the slot 30 which is adjacent the supply roll and re-enters the housing interior through the slot 32 with the section between the slots supported on panel 34. Slots 30, 32 are spaced sufficiently apart as to expose a significant length of the record strip and the supporting panel 34 is of flat smooth configuration to allow for easy inscription upon the record strip section supported thereby. If desired, the slots themselves may be leveled or inclined in opposite directions, as suggested in FIG. 2, to facilitate smooth passage of the record strip therethrough out of and into the housing interior.

While the front housing wall 14 can extend in generally flat parallel fashion to the rear wall 12, preferably it is contoured so that at least the supporting panel 34 is inclined at a slight angle, say about 20°–30° out of parallel to the rear wall 12. To avoid undue increase of the thickness of the housing as a consequence of such contouring, one end portion of wall 14 may be found as a semi-cylindrical enlargement 14a to accommodate the fully wound roll of record strip 28, the lower edge of such enlargement connecting to the depressed upper end of the remainder of wall 14. In that case, the corner opposite enlargement 14a may be rounded, as at 14b, for a harmonious appearance.

When the front housing wall 14 is contoured in this fashion, the unwinding and winding directions of the supply and take-up rollers 24, 25 are arranged oppositely with the record strip leaving the supply roll tangentially on one side thereof and approaching the take-up roll tangentially but on the opposite side of that roll, relative to a plane passed through the roller axes. Consequently, the path of the record strip intermediate such rollers tends to be more or less parallel to the angle of inclination of the supporting panel 34 avoiding unnecessary abrasive and resistance effects on the strip in its passage through the device.

The diagnostic tests usually required to be performed by diabetic patients and especially those in which the disease has some severity, involving the measurement of the level of glucose in the urine to ascertain if that level is excessively high (glycosuria) and, similarly, the measurement of the level of "ketone bodies" in the urine to ascertain if that level has exceeded normal standards (ketosuria). Convenient pocket test kits for accomplishing these measurements are now readily available and are usually of a color responsive character in which the tint of a test strip or test solution varies in accordance with the varying level of the condition being measured and can be compared with a standard color chart which is calibrated to express the measurement as a percentage or other value. When the disease is especially severe, both these tests are required to be made at repeated intervals during each day, usually before each meal and at bedtime. For less severe cases, a measurement at lesser intervals, i.e. once a day or even for isolated days of a given week, may suffice.

Insulin is available in various forms or types which have been prepared to either accelerate or delay or prolong the effect of a given dose as may best suit the needs of the particular patient. Also, various concentrations of each type of insulin are available in which a given quantity contains a larger or smaller dosage and in some instances mixtures of different concentrations or of different types may be prescribed by the physician to suit the special requirements of some individuals. Consequently, it becomes important to note at the time of each injection the particular amount of insulin being injected, which is expressed in terms of "units," since that amount may vary from day to day or may be "tailored" from a combination of preparations.

To enable the above information to be recorded, the record strip 28 is divided in its crosswise direction into rows, one for each of a succession of days or perhaps for selected days within a given weekly or monthly interval, and at one end of each such row calendar dates covering a given calendar period, for example a year, are preferably printed in succession. In its lengthwise direction, record strip 28 is divided into a number, preferably 12, columns, one of which lists the calendar dates just described. Eight of the other columns are grouped as adjacent pairs to receive the results of the sugar level measurement and ketone level measurement tests at certain times of day and the exterior face of the housing front wall 14 carries indicia identifying the tests of each column pair, i.e. "sugar" and "ketone," as well as the respective times of the day that such tests are to be made, i.e. "breakfast," "lunch," "dinner" and "bed" or "bedtime." A further column is intended to receive the unit amount of insulin administered on each calendar date and is so identified by an appropriate heading, i.e. "units," inscribed in alignment therewith on the housing exterior.

Inasmuch as the insulin is administered by hypodermic injection and the site of the injection must be changed daily in a systematic way to avoid undesirable local effects on the adjacent tissue, a further column is provided for the identification of the particular injection site employed that date and is so marked with an appropriate indicia, i.e. "location" on the housing exterior. Finally, a column for specific observations or general comments which the patient may desire to record on that date is included with the housing carrying a legend such as "remarks" above this column.

Where the disease can be maintained by a less frequent regime, the sequence of calendar dates can be modified according to the selected frequency and/or entries omitted from superfluous columns.

The "diary" of this invention can be located in a conspicuous place, for instance, the wall of the toilet, to serve as a reminder to the patient, which is particularly helpful for juveniles, and when filled in with the required information can be easily carried to the attending physician who by rewinding the record strip can obtain a direct day-to-day indication of the course of the disease during a treatment period.

What is claimed is:

1. A record keeping device for diabetics comprising a generally shallow rectangular housing containing rotatable spaced apart elongated rollers, one of said rollers initially carrying wound thereon a length of a record strip or web suitable for inscription and of a width somewhat less than the housing width and the other roller being connected to the free strip end for collecting the strip thereon during use, and at least one exteriorly accessible knob connected to each said roller for manual roller rotation to wind said strip between said rollers, said housing having a planar back cover, opposite pairs of side and end walls extending generally perpendicular to the plane of said back cover, and a front wall extending between said side and end walls, said front wall having a planar panel section intermediate said end walls which is inclined in the end wall direction at an angle relative to said back cover, whereby one edge of said panel section is higher than the other relative to said back cover, and extending between the lower end of said inclined panel section and the adjacent end wall a connecting section which is bowed away from said back cover, one of said rollers being disposed within said bowed connecting section and the other adjacent the higher end of said inclined panel section, said inclined panel section having therein two elongated slots arranged in spaced generally parallel relation to each other and to said end walls, said slots having a length exceeding the record strip width, said record strip being delivered between said rollers along a path which is generally parallel to the inclined plane of said inclined front panel section and passing through said slots to dispose a region of said path exteriorly of said housing to permit inscription upon the web in said region, said path tangentially intersecting the periphery of the roller adjacent the higher edge of said inclined panel section on the side thereof remote from said back cover and the periphery of the roller within the bowed connecting section on the side thereof toward said back cover, a plane extending across the space between said rollers and passing through the points of intersection of said path with the respective roller peripheries remaining substantially parallel to said planar panel section as said record strip is transferred from one roller to the other, said slots extending through said inclined panel section in opposite generally sloping directions substantially corresponding with said strip path, said record strip being divided cross-wise into parallel rows, one for each calendar day of a given recording period, and lengthwise into a plurality of columns for inscription thereon of the unit quantity of insulin injected per day, the times and results of multiple repetitive diabetic diagnostic tests, the selected body site for the injection, and miscellaneous comments by the patient, said housing carrying on its front wall appropriate indicia for identifying the respective columns.

2. The record keeping device of claim 1, wherein said housing has solid parallel side walls which are apertured to rotatably support said rollers and said knobs are affixed to exteriorly projecting ends of said rollers.

3. The record keeping device of claim 1 wherein the separation between said elongated slots in said inclined panel section is equal to a plurality of the cross-wise rows of said record strip whereby a plurality of daily entries on said strip are simultaneously exposed for direct comparison.

* * * * *